US006595503B1

(12) United States Patent
Cheng

(10) Patent No.: US 6,595,503 B1
(45) Date of Patent: Jul. 22, 2003

(54) CUSHIONING DEVICE WITH U-SHAPED STRIP PORTIONS

(76) Inventor: Jian-Rung Cheng, 9F, No. 90, Hsing-Te Rd., San-Chung City, Taipei Hsien (TW)

( * ) Notice: Subject to any disclaimer, the term of this patent is extended or adjusted under 35 U.S.C. 154(b) by 0 days.

(21) Appl. No.: 10/222,607

(22) Filed: Aug. 16, 2002

(51) Int. Cl.[7] .................................................. F16F 1/18
(52) U.S. Cl. ...................................... 267/160; 267/165
(58) Field of Search ................................ 267/158, 160, 267/164, 165, 182

(56) References Cited

U.S. PATENT DOCUMENTS 5,409,200 A  *  4/1995  Zingher et al. ............. 267/160
5,551,673 A  *  9/1996  Furusawa et al. .......... 267/160
5,785,303 A  *  7/1998  Kutschi ...................... 267/103
6,170,808 B1 *  1/2001  Kutschi ...................... 267/107
2002/0079627 A1 * 6/2002  McCollough et al. ....... 267/107

* cited by examiner

Primary Examiner—Christopher P. Schwartz
(74) Attorney, Agent, or Firm—Merchant & Gould P.C.

(57) ABSTRACT

A cushioning device includes a mounting plate disposed in parallel to a base plate. The mounting plate has a connecting surface facing the base plate, and a mounting surface opposite to the connecting surface and mounted on an object to be cushioned. A cushioning unit is mounted fixedly between the base plate and the mounting plate, and includes an intermediate plate disposed between and parallel to the base and mounting plates, and a plurality of cushioning members, each of which has a first U-shaped strip portion mounted fixedly between the base plate and the intermediate plate, and a second U-shaped strip portion mounted fixedly between the mounting plate and the intermediate plate.

7 Claims, 7 Drawing Sheets

CUSHIONING DEVICE WITH U-SHAPED STRIP PORTIONS

BACKGROUND OF THE INVENTION

1. Field of the Invention

The invention relates to a cushioning device, more particularly to a cushioning device with U-shaped strip portions.

2. Description of the Related Art

FIG. 1 illustrates a conventional cushioning device 100 that includes a base plate 10, a mounting plate 12 disposed in parallel and spaced apart from the base plate 10, and a plurality of resilient pieces 14 disposed between the base plate 10 and the mounting plate 12. The mounting plate 12 can be attached on a bottom or a supporting frame of an industrial machine (not shown) via a screw rod 121 on the mounting plate 12 for positioning the machine on the mounting plate 12. By virtue of the extension and retraction of the resilient pieces 14, it is possible to reduce the adverse influence of naturally occurring vibrations on the machine due. However, the conventional cushioning device 100 is formed via a relatively complex assembly process. Moreover, the resilient pieces 14, which are pressed by the machine, easily experience spring fatigue after a period of use.

FIG. 2 illustrates another conventional cushioning device 200 that includes a base unit 20, an outer wall 22 disposed on the base unit 20, and a supporting frame 26 extending outwardly from the base unit 20. Rubber 24 is filled within all space between the outer wall 22 and the base unit 20. The outer wall 22 can be attached on a bottom or a supporting frame of an industrial machine (not shown). However, the conventional cushioning device 200 is also formed via a relatively complex assembly process. Moreover, after a period of use, the cushioning effect of the conventional cushioning device 200 is impaired due to deterioration of the rubber 24.

FIG. 3 illustrates still another conventional cushioning device 300, which is applied to a building (not shown), that includes a base unit 30, a top unit 31, a resilient body 35 disposed between the base and top units 30, 31, and a plurality of connecting rods 33 interconnecting the base and top units 30, 31 and provided with a plurality of damping devices 331 thereon. A supporting column 39 of the building is disposed fixedly on the top unit 31. The convention cushioning device 300 has a complex construction that consists of too many components, thereby resulting in relatively high costs and in a relatively long assembly time.

SUMMARY OF THE INVENTION

Therefore, the object of the present invention is to provide a cushioning device that utilizes arched metal plates so as to achieve a cushioning effect, thereby overcoming the shortcomings associated with the aforesaid conventional cushioning devices.

According to the present invention, a cushioning device comprises:

a base plate having a first connecting surface;

a mounting plate disposed in parallel to and spaced apart from the base plate, the mounting plate having a second connecting surface facing the first connecting surface, and a mounting surface opposite to the second connecting surface and adapted to be mounted on an object to be cushioned; and a cushioning unit mounted fixedly between the first connecting surface of the base plate and the second connecting surface of the mounting plate, the cushioning unit including an intermediate plate disposed between and parallel to the base and mounting plates, and a plurality of cushioning members, each of which has a first U-shaped strip portion that is mounted fixedly between the first connecting surface of the base plate and the intermediate plate, and a second U-shaped strip portion that is mounted fixedly between the second connecting surface of the mounting plate and the intermediate plate.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
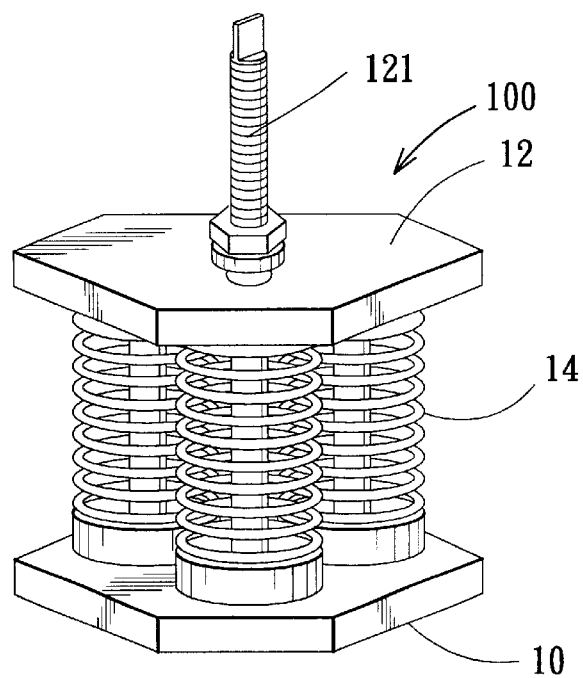
FIG. 1 a perspective view of a conventional cushioning device.
Figure 2:
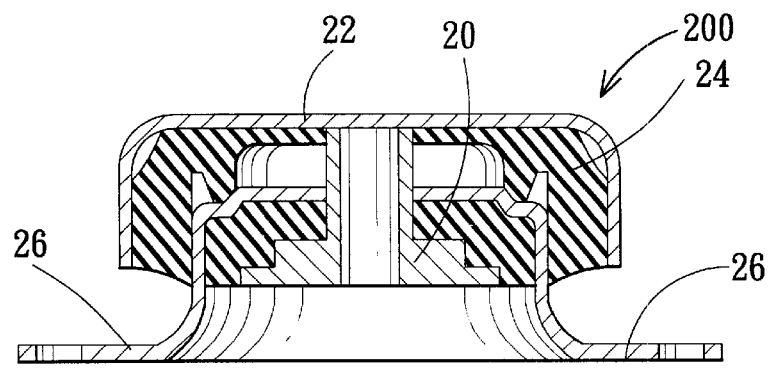
FIG. 2 is a schematic sectional view of another conventional cushioning device.
Figure 3:
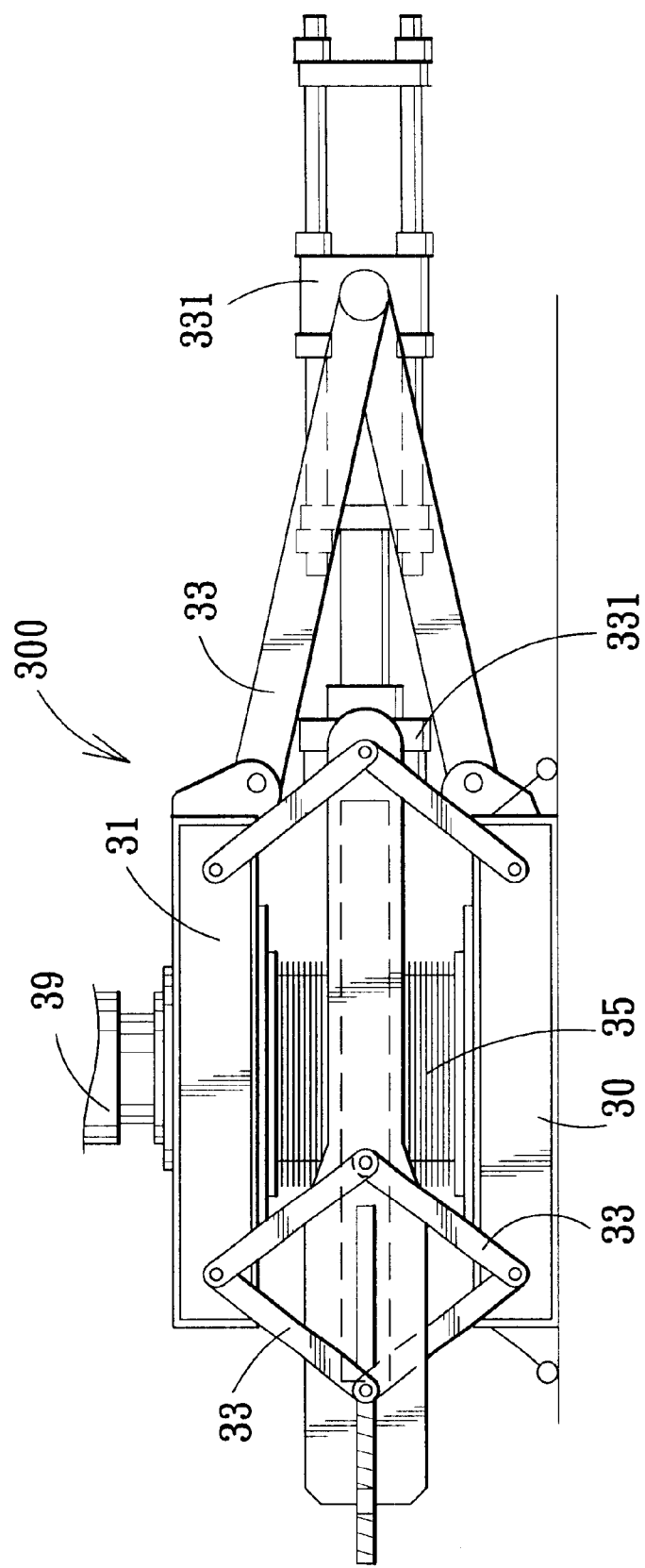
FIG. 3 is a schematic side view of still another conventional cushioning device.
Figure 4:
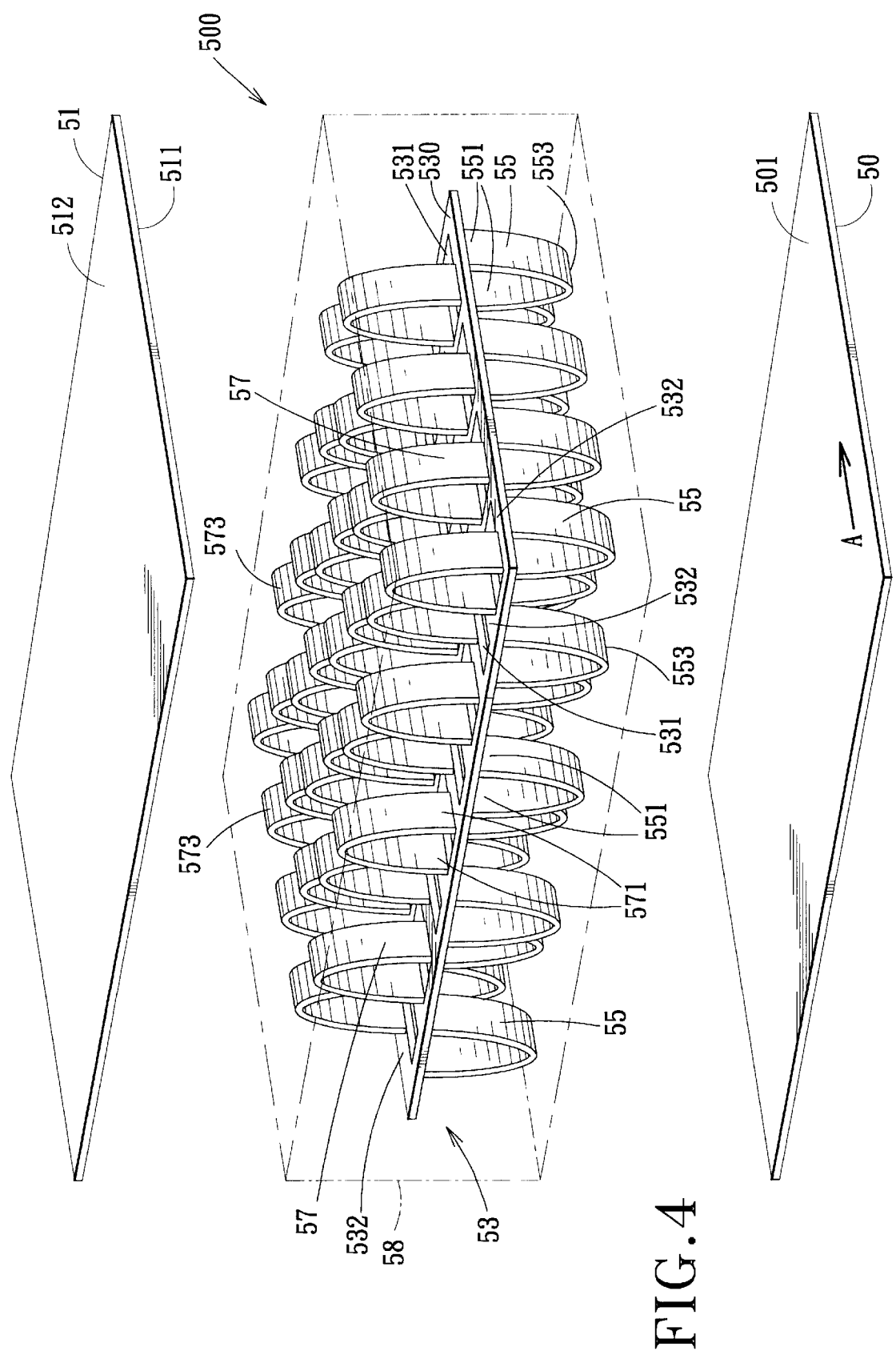
FIG. 4 is an exploded perspective view showing the first preferred embodiment of a cushioning device according to the present invention.
Figure 5:
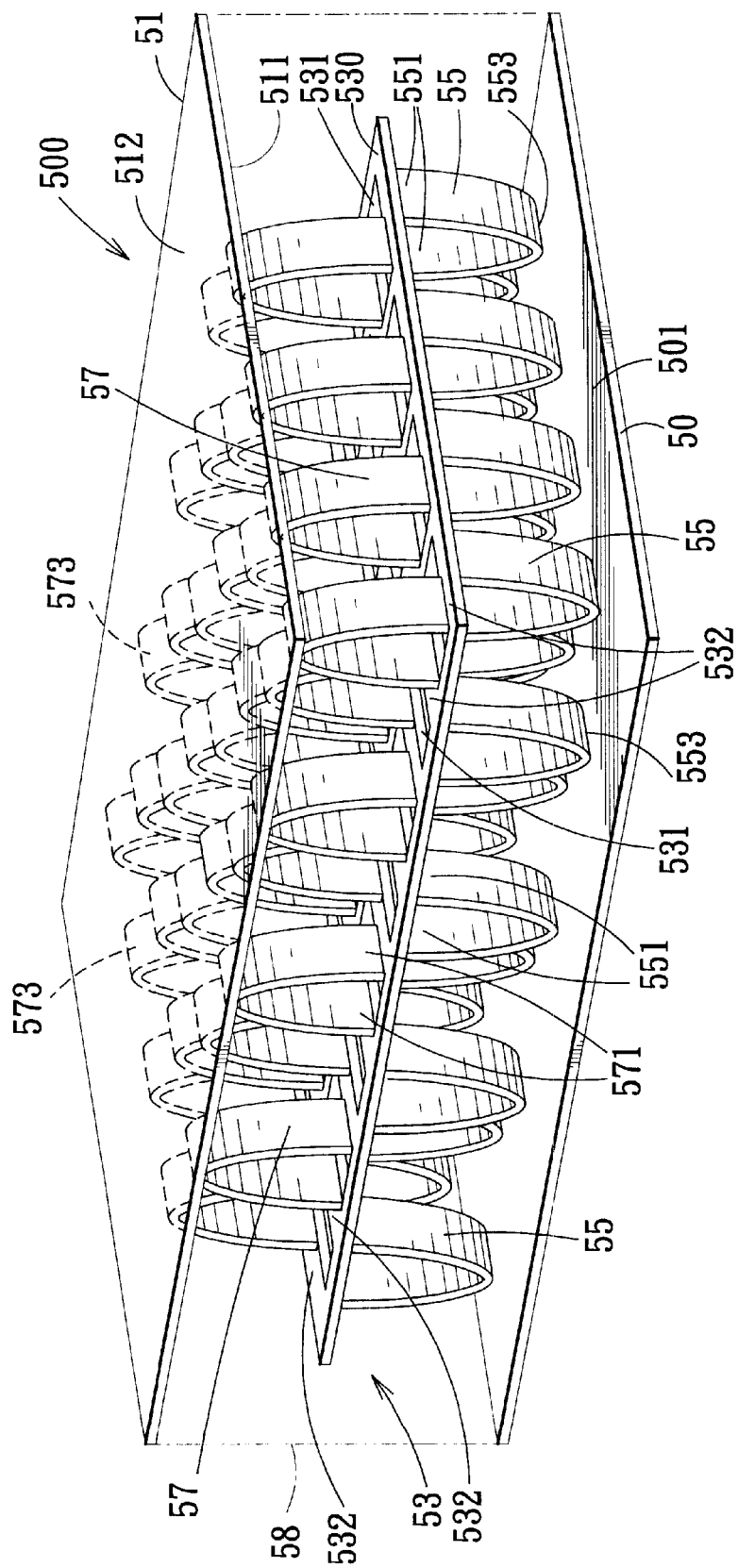
FIG. 5 is an assembled perspective view showing the first preferred embodiment.

Referring to FIGS. 4 and 5, the first preferred embodiment of a cushioning device 500 according to the present invention is shown to include a base plate 50, a mounting plate 51, and a cushioning unit 53.

The base plate 50, which is rectangular, has a first connecting surface 501.

The mounting plate 51, which is rectangular, is disposed in parallel to and is spaced apart from the base plate 50. The mounting plate 51 has a second connecting surface 511 facing the first connecting surface 501, and a mounting surface 512 opposite to the second connecting surface 511 and adapted to be mounted on an object (not shown) to be cushioned.

The cushioning unit 53 is mounted fixedly between the first connecting surface 501 of the base plate 50 and the second connecting surface 511 of the mounting plate 51. The cushioning unit 53 includes an intermediate plate 530 and a plurality of cushioning members.

The intermediate plate 530 is disposed between and is parallel to the base and mounting plates 50, 51. In this embodiment, the intermediate plate 530 is formed with a plurality of rows of rectangular through holes 531. Each row of the through holes 531 is arranged along a direction (A).

The intermediate plate 530 includes a plurality of parallel elongated plate portions 532, each of which extends along the direction (A). The plate portions 532 in each adjacent pair are spaced apart from each other so as to define two opposite sides of a corresponding row of the through holes 531.

Each cushioning member has a first U-shaped strip portion 55 that is mounted fixedly between the first connecting surface 501 of the base plate 50 and the intermediate plate 530, and a second U-shaped strip portion 57 that is mounted fixedly between the second connecting surface 511 of the mounting plate 51 and the intermediate plate 530. In this embodiment, the cushioning members are arranged in a plurality of rows. Each of the first and second U-shaped strip portions 55, 57 of each row of the cushioning members has two ends 551, 571 that are formed integrally with an adjacent pair of the plate portions 532 defining respectively two opposite sides of a corresponding one of the through holes 530. The first U-shaped strip portion 55 of each cushioning member further has a first bent portion 553 that is disposed fixedly on the first connecting surface 501 of the base plate 50. The second U-shaped strip portion 57 of each cushioning member further has a second bent portion 573 that is disposed fixedly on the second connecting surface 511 of the mounting plate 51. In this embodiment, the first bent portion 553 of the first U-shaped strip portion 55 of each cushioning member is connected to the first connecting surface 501 of the base plate 50 by welding. The second bent portion 573 of the second U-shaped strip portion 57 of each cushioning member is connected to the second connecting surface 511 of the mounting plate 51 by welding. It is noted that the first and second U-shaped strip portions 55, 57 of each row of the cushioning members are staggered. The first U-shaped strip portions 55 of each adjacent pair of rows of the cushioning members are preferably staggered. The second U-shaped strip portions 57 of each adjacent pair of rows of the cushioning members are preferably staggered. The first and second U-shaped strip portions 55, 57 of each cushioning member are formed by a punching process by a press machine, thereby leaving a corresponding one of the through holes 531 in the intermediate plate 530.

Besides, a rubber block 58, indicated by imaginary lines in FIG. 5, is used to fill all space between the base plate 50 and the mounting plate 51 so as to protect the cushioning unit 53.

Figure 6:
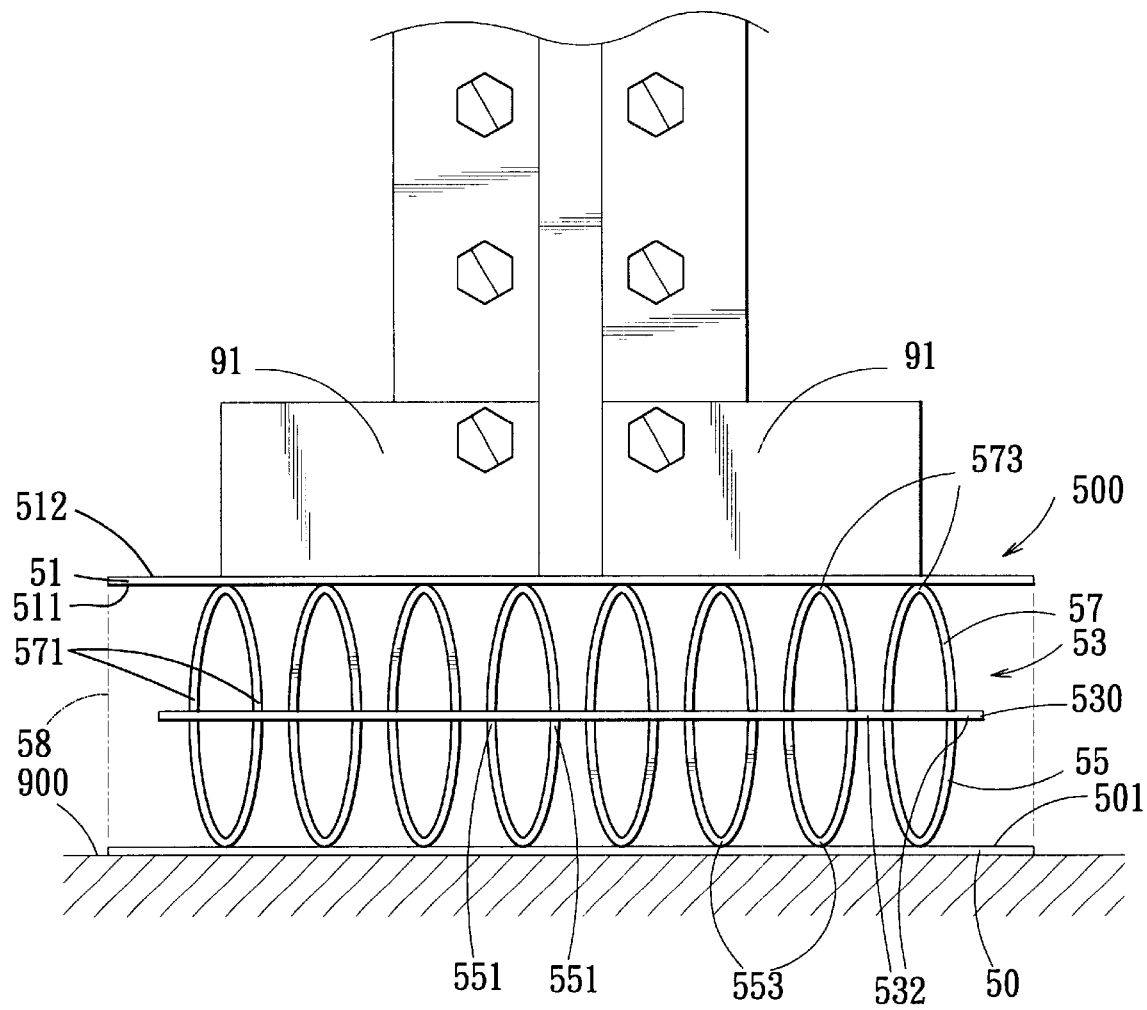
FIG. 6 is a schematic view showing the first preferred embodiment when applied on an industrial machine.

With reference to FIG. 6, the cushioning device 500 of this invention is adapted to be disposed on a supporting surface 900 and is applied on an industrial machine (not shown). The mounting surface 512 of the mounting plate 51 is adapted to be mounted on a supporting frame 91 of the industrial machine (not shown). As such, vibration acting on the supporting surface 900 can be damped via the cushioning device 500 so as to reduce the adverse effect of the vibration on the industrial machine.

Figure 7:
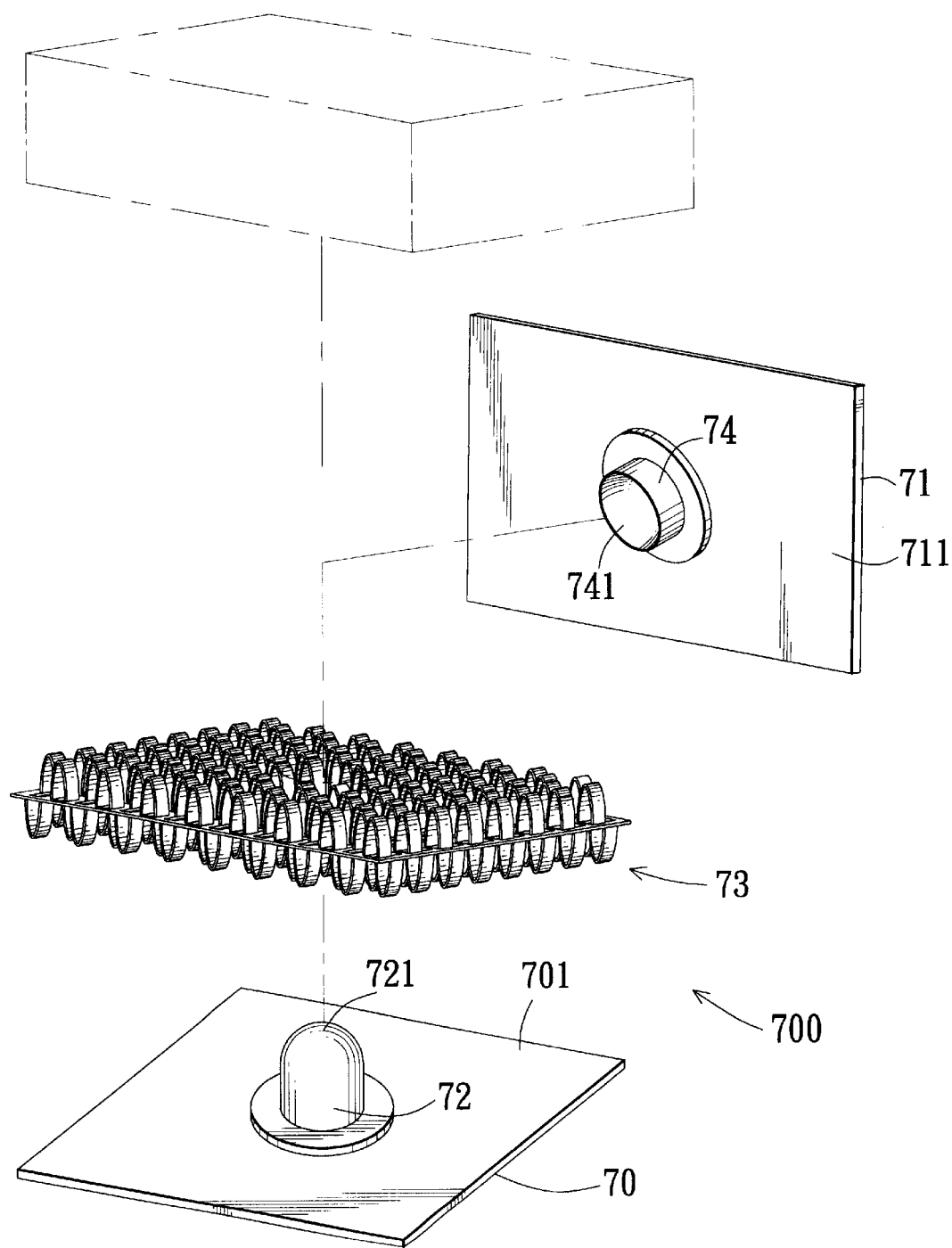
FIG. 7 is an exploded perspective view showing the second preferred embodiment of a cushioning device according to the present invention.
Figure 8:
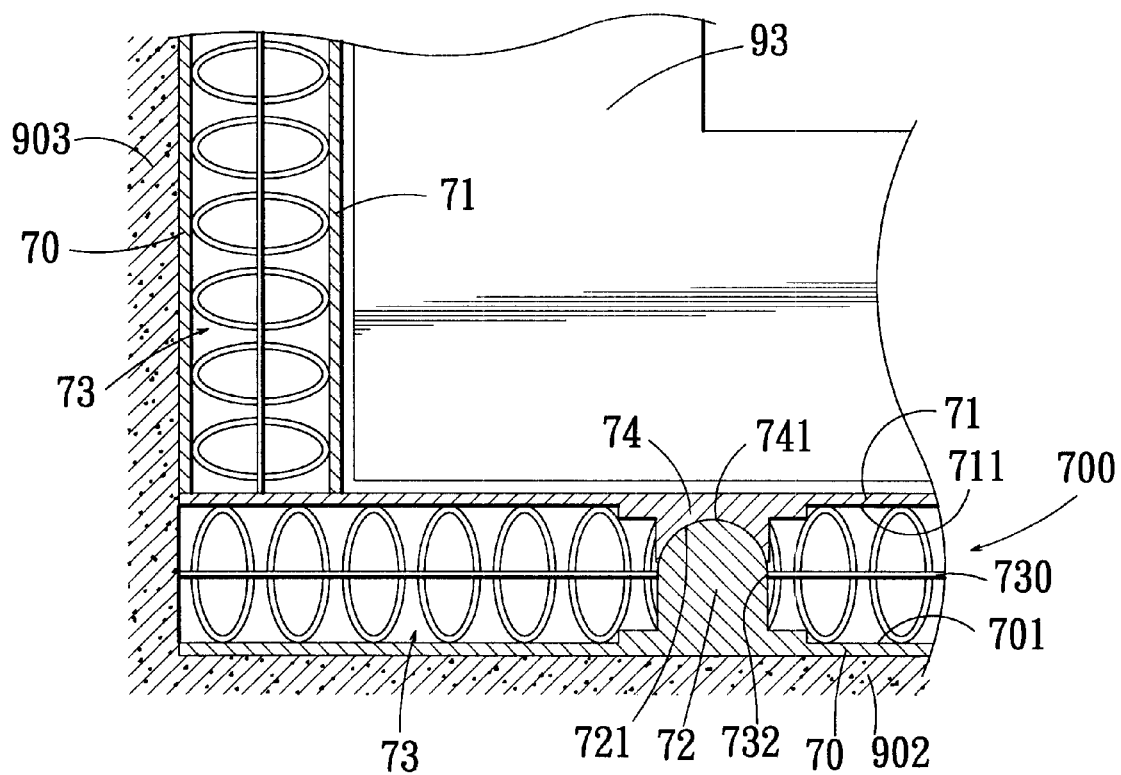
FIG. 8 is an fragmentary,partly sectional schematic view showing the second preferred embodiment when applied in a building construction.

FIGS. 7 and 8 illustrate the second preferred embodiment of a cushioning device 700 according to this invention, which is a modification of the first preferred embodiment. Unlike the previous embodiment, the cushioning device 700 is applied in a foundation layer 902 and an upright wall 903 of a building construction (not shown), and includes a plurality of cushioning units 73. The base plate 70 of each cushioning unit 73 further has a fixed supporting post 72 that extends from the first connecting surface 701 toward the second connecting surface 711 of the mounting plate 71 via a through hole 732 formed in the intermediate plate 730. The supporting post 72 is preferably aligned with a main column 93 of the building construction, as shown in FIG. 8, so as to support of the latter. The mounting plate 71 further has a coupling member 74 mounted fixedly on the second connecting surface 711. The supporting post 72 has a convex end surface 721. The supporting member 74 has a concave surface 741 that engages the convex end surface 721 of the supporting post 72, as shown in FIG. 8. In this embodiment, the convex end surface 721 is hemi-spherical. The concave surface 741 engages fittingly the convex end surface 721.

It is noted that, since the size of the cushioning device of the present invention depends on the machine or the building construction to be disposed thereon, the cushioning device of the present invention can be designed to fit various kinds of machines or building constructions, thereby increasing its applicable range so as to result in greater flexibility during use. Furthermore, the first and second U-shaped strip portions can be formed by punching the intermediate plate, thereby resulting in a simplified manufacturing process.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A cushioning device comprising:

a base plate having a first connecting surface;

a mounting plate disposed in parallel to and spaced apart from said base plate, said mounting plate having a second connecting surface facing said first connecting surface, and a mounting surface opposite to said second connecting surface and adapted to be mounted on an object to be cushioned; and a cushioning unit mounted fixedly between said first connecting surface of said base plate and said second connecting surface of said mounting plate, said cushioning unit including an intermediate plate disposed between and parallel to said base and mounting plates, and a plurality of cushioning members, each of which has a first U-shaped strip portion that is mounted fixedly between said first connecting surface of said base plate and said intermediate plate, and a second U-shaped strip portion that is mounted fixedly between said second connecting surface of said mounting plate and said intermediate plate.

2. The cushioning device as claimed in claim 1, wherein said intermediate plate has a plurality of elongated plate portions and a plurality of through holes, each of which has two opposite sides that are defined by one adjacent pair of said elongated plate portions, each of said first and second U-shaped strip portions of each of said cushioning members being disposed adjacent to a corresponding one of said through holes and having two ends, which are connected respectively and fixedly to one adjacent pair of said elongated plate portions that define the two opposite sides of the corresponding one of said through holes, said first U-shaped strip portion of each of said cushioning members further having a first bent portion that is disposed fixedly on said first connecting surface of said base plate, said second U-shaped strip portion of each of said cushioning members further having a second bent portion that is disposed fixedly on said second connecting surface of said mounting plate.

3. The cushioning device as claimed in claim 2, wherein said first and second U-shaped strip portions of said cushioning members are staggered.

4. The cushioning device as claimed in claim 2, wherein said first U-shaped strip portion of each of said cushioning members is connected between said intermediate plate and said first connecting surface of said base plate by welding, and said second U-shaped strip portion of each of said cushioning members is connected between said intermediate plate and said second connecting surface of said mounting plate by welding.

5. The cushioning device as claimed in claim 1, further comprising a rubber block filling all space between said base plate and said mounting plate.

6. The cushioning device as claimed in claim 1, wherein said base plate further has a fixed supporting post that extends from said first connecting surface toward said second connecting surface of said mounting plate, said mounting plate further having a coupling member mounted fixedly on said second connecting surface, said supporting post having a convex end surface, said coupling member having a concave surface that engages said convex end surface.

7. The cushioning device as claimed in claim 6, wherein said convex end surface is hemi-spherical, said concave surface engaging fittingly said convex end surface.

* * * * *